Jan. 22, 1963  H. KÖPPEN  3,074,331
PHOTOGRAPHIC CAMERAS
Filed Aug. 21, 1961  8 Sheets-Sheet 1

Jan. 22, 1963 H. KÖPPEN 3,074,331
PHOTOGRAPHIC CAMERAS
Filed Aug. 21, 1961 8 Sheets-Sheet 4

United States Patent Office 3,074,331
Patented Jan. 22, 1963

3,074,331
PHOTOGRAPHIC CAMERAS
Heinz Köppen, Stuttgart, Germany, assignor to Zeiss
Ikon Aktiengesellschaft, Stuttgart, Germany
Filed Aug. 21, 1961, Ser. No. 132,663
Claims priority, application Germany Aug. 27, 1960
17 Claims. (Cl. 95—10)

The invention relates to improvements in photographic cameras and particularly is concerned with photographic cameras equipped with a flash exposure mechanism suitable for single lens mirror reflex cameras, as well as for all other cameras equipped with an adjustable exposure mechanism and with a spring actuated diaphragm mechanism.

It is known to couple the distance adjusting member of photographic cameras with the diaphragm adjusting member in such a manner that when employing a flash gun producing a flash corresponding to a certain guide number a corresponding adjustment of the diaphragm according to the relation guide number=diaphragm times distance will take place.

It is an object of the invention to provide a flash exposure mechanism for all cameras equipped with a spring diaphragm by employing a spring actuated diaphragm mechanism whose completely open diaphragm will be kept open when the camera is tensioned, independent of the distance value and the guide number value, respectively, which may have been set. Furthermore, there is provided an intermediate member, a so-called catch member, which stores the adjusted values and which is controlled by the distance adjusting mechanism and, if present, by the guide number adjusting mechanism. This catch member engages the diaphragm mechanism when the camera is released and thus determines the aperture of the diaphragm according to the pre-set values.

One embodiment of the invention consists essentially in this, that the diaphragm segment control ring, when the camera is tensioned, against the action of a return spring is brought into and maintained in its end position corresponding to the full diaphragm opening by means of a locking member actuated by the shutter setter, that the control ring itself or a ring connected or detachably connected therewith is provided with a ratchet portion, and that when the camera is released the control ring together with the ring connected therewith performs a return movement until the ratchet portion comes into engagement with the catch member controlled by the distance and guide number adjusting device, respectively.

The ratchet portion of the diaphragm control ring is arranged opposite a catch member which in its simplest form consists of a two arm lever rotatable about a stationary axis. One end of this lever by the action of s spring slides along the inner side of the distance adjusting ring, while the other end serves as striking tip for the ratchet portion of the diaphragm control ring. That portion of the inner side of the distance adjusting ring which is in engagement with the mentioned lever end is formed as a cam face which has the properties of a control cam as well as of a compensating cam. According to the adjusted distance the catch member on account of the shape of the cam face will have quite different deflecting positions which in consequence of the release of the camera will cause the diaphragm control ring to a return movement which in turn will effect sooner or later an engagement of the catch member with the ratchet portion which will bring the return movement of the diaphragm control ring to a stop.

Hence, when the camera is released, the diaphragm control ring moves back toward a reduction of the diaphragm aperture and its ratchet portion will come into engagement with the catch member in dependence upon the distance set. The cam face in the inner side of the distance adjusting ring is formed with respect to the distance adjustment in such a manner that at short distances the striking tip of the catch member is moved away from the ratchet portion, and at longer distances is moved toward this ratchet portion. This means that at small distances the diaphragm control ring is able to perform a long return movement before it comes into engagement with the catch member. Consequently, the diaphragm could close to a great extent. At longer distances, however, the diaphragm control ring will strike the catch member after only a short return movement so that the diaphragm can close only to a small extent.

Another object of the invention is to consider a number of distance adjustments and a number of guide numbers in connection with a flash exposure mechanism by employing a lever combination as catch member in place of a single lever. Preferably, the lever combination consists of two levers which are arranged with respect to each other and cooperate with the cams of the distance adjusting ring and the guide number ring in the following manner:

One end of the first lever is rotatable about a stationary axis while the other end of the same lever cooperates with the cam on the guide number ring. This first lever carries in its approximate center the axis for the second lever, one end of which cooperates with the cam of the distance adjusting ring, while the other end forms the striking point of the catch member proper which cooperates with the ratchet portion. It is obvious that by means of this lever combination the distance adjustment factor as well as the guide number selection can be introduced into the catch member mechanism. By deflections of the first lever on the cam of the guide number ring, the second lever which actually constitutes the catch member proper is moved along towards the ratchet portion or away from it, because the first lever carries the axis of the second lever. Furthermore, the second lever by its collaboration with the cam of the distance adjusting ring is subjected to angular displacements to one or the other side whereby its angular position with respect to the ratchet portion is changed. Ultimately, the lever combination produces the same result as the previously described structures, namely that high guide numbers and short picture distances place the catch member in such a position with respect to the ratchet portion that the diaphragm control ring is stopped only after a long return movement which results in a small diaphragm aperture, while when low guide numbers and great picture distances are selected, the position of the catch member with respect to the ratchet portion will be such that the diaphragm control ring will be stopped already after a very short movement so that the diaphragm will be still wide open.

A still further object of the invention is to provide a largely automatic camera by coupling the flash exposure mechanism with an exposure mechanism.

The inventive mechanism can be arranged in the camera or on the camera objective. It is particularly suitable for completely exchangeable camera objectives which have their own diaphragm mechanism. It is self-evident that the invention may be applied as well to cameras provided with a curtain shutter or with a shutter arranged in the camera objective.

With these and other objects in view which will follow hereinafter, the invention will now be described in detail with reference to the accompanying drawings which show by way of example several embodiments of the invention.

Figure 1:
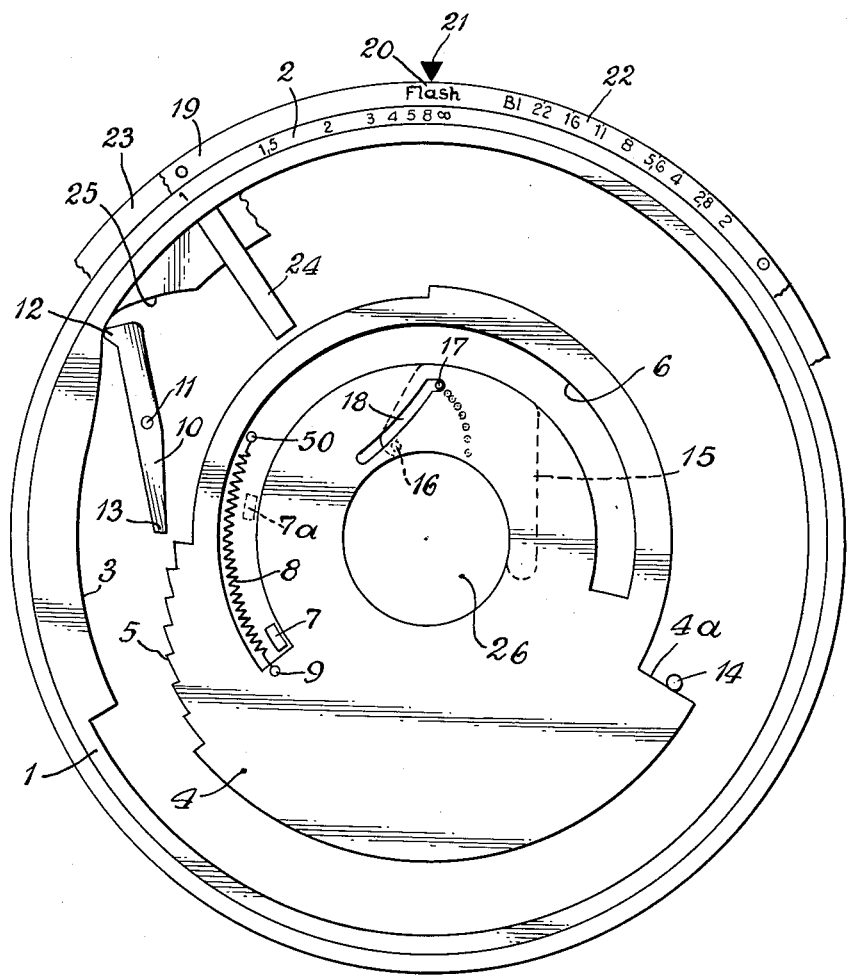
FIG. 1 illustrates diagrammatically a front elevation view of concentrically arranged control rings for a photographic camera and the parts connected therewith.

Referring to the drawings, FIG. 1 shows a distance adjusting ring 1 for a photographic camera. This ring 1 is provided with the distance scale 2 which can be adjusted relatively to a stationary index 21. The distance adjusting ring 1 carries at its inner circumference a deflecting and compensating cam 3 which cooperates with a two armed lever 10 constituting a catch member. More specifically, the one lever end forming a follower head 12 is under the action of a spring (not shown) and is urged in engagement with the cam 3, while the other lever end 13 serves as a striking point with respect to a ratchet portion 5 arranged on the diaphragm control ring 4 which is arranged concentrically to the ring 1. The lever 10 pivots about a stationary axis 11.

The diaphragm control ring 4 carrying the ratchet portion 5 is shown in the position of the largest diaphragm aperture of the tensioned camera, as will be seen from the position of one of the indicated diaphragm segments 15. With 7 is designated a follower member actuated by the shutter winding device which follower member moves within a curved slot 6. When the camera is released, the follower member 7 will be in the position 7a and when the camera is tensioned, it will be in the position 7. Between these two positions 7 and 7a is arranged the entire diaphragm range. The diaphragm control ring 4 which in the tensioned camera on one side is blocked by the member 7 actuated by the shutter tensioning device, is blocked at its other side by a stationary pin 14 engaging a radial shoulder 4a on the ring 4. A spring 8 fastened with one end to the casing at 50 and with the other end to the diaphragm control ring 4 at 9 seeks to pull the diaphragm control ring 4 in the direction toward the smallest diaphragm aperture. By actuating the camera release the ring 4 therefore moves back in clockwise direction and in accordance with the extent of this return movement the diaphragm will be more or less closed. The illustrated diaphragm segment 15 which pivots about the axis 16 attached to a second diaphragm cage (not shown) into the light passage opening 26, will during the return movement of the diaphragm control ring 4 be caused to close in that its point of action 17 for the movement into the slot path 18 provided in the ring 4 will be lowered, whereby the closure points indicated in FIG. 1 will be obtained according to the individual diaphragm intervals.

During an adjustment of the distance adjusting ring 1, the catch member 10 will be more or less deflected by the cam 3 and thereby will assume different angular positions with respect to the ratchet portion 5 which latter preferably has an axial graduation. In the illustrated adjustment of a distance of 8 meters, which is the greatest possible distance for flash exposures, the catch member 10 shows a large angle of incidence with respect to the ratchet portion 5. This means that the control ring 4, when the camera is released, has to rotate back only a small distance and therefore the diaphragm can close only about a few steps. It is assumed that for this operation a constant guide number is used, in this case the number 28. If shorter distances are set by means of the distance adjusting ring, then the follower head 12 of the catch member 10 will move into the region of the more curved parts of the cam 3, whereby the angle of incidence of the catch member 10 will become smaller with respect to the ratchet portion 5. Therefore, when the camera is released and the diaphragm control ring 4 is performing its return movement, the point 13 of the catch member 10 will engage only the last steps of the ratchet portion 5. The diaphragm control ring 4 has thus been able to perform a more or less complete return movement which as a consequence caused a more or less complete closure of the diaphragm.

As already pointed out on the preceding pages, the simplest embodiment of the inventive principle is a camera which is provided with a flash exposure mechanism intended only for an average guide number and, furthermore, also is provided with a conventional manual diaphragm adjustment mechanism. In order to be able to selectively switch from the manual diaphragm mechanism to the flash exposure mechanism and vice versa, there is provided an actuating ring 19 which is arranged concentrically to the rings 1 and 4 and carries on its circumference an adjustable mark 20 movable to a position opposite the stationary index 21 for the purpose of switching to the flash exposure mechanism. This ring 19 is also provided with a diaphragm scale 22 for the manual diaphragm setting or pre-setting. A registration of the mark 20 with the stationary index 21 has the effect that the manual diaphragm adjustment is suspended and the camera is ready for flashlight operations. A registration of a number of the diaphragm scale 22 with the index 21 effects, however, a suspension of the flash exposure mechanism so that a manual diaphragm adjustment is possible. Both operation ranges have, however, in common that the diaphragm always will assume its pre-selected aperture or its aperture determined by the flash exposure only at the moment the camera is released.

The switching from one range of operation to the other requires on one hand that the catch member 10 is rendered ineffective and on the other hand that the catch member 10 is restored to its required cooperation with the ratchet portion 5. For this purpose is provided a control cam 25 on a ring 23 which is connected with the actuating ring 19. As will be seen from the drawing, a rotation of the rings 19, 23 in counterclockwise direction will bring the manual diaphragm adjustment mechanism in registration with the index 21, and the catch member 10 will be moved by the cam 25 away from the ratchet portion 5 and the cam 3. This is effected in that the follower head 12 slides along the cam 25 whereby the lever 10 performs a rotation in clockwise direction and lifts the follower head 12 from the cam 3 and the point 13 is removed from the path of the ratchet portion 5.

Above or below the catch member 10 is provided an abutment lug 24 arranged on the actuating ring 19 for the pre-selection of the diaphragm. According to the diaphragm aperture set at the diaphragm scale 22, the lug 24 will be positioned closer or farther away from the first step of the ratchet portion 5 so that corresponding to the shorter or longer return movement of the diaphragm control ring 4 the larger or smaller diaphragm aperture will result when the camera is released.

Figure 2:
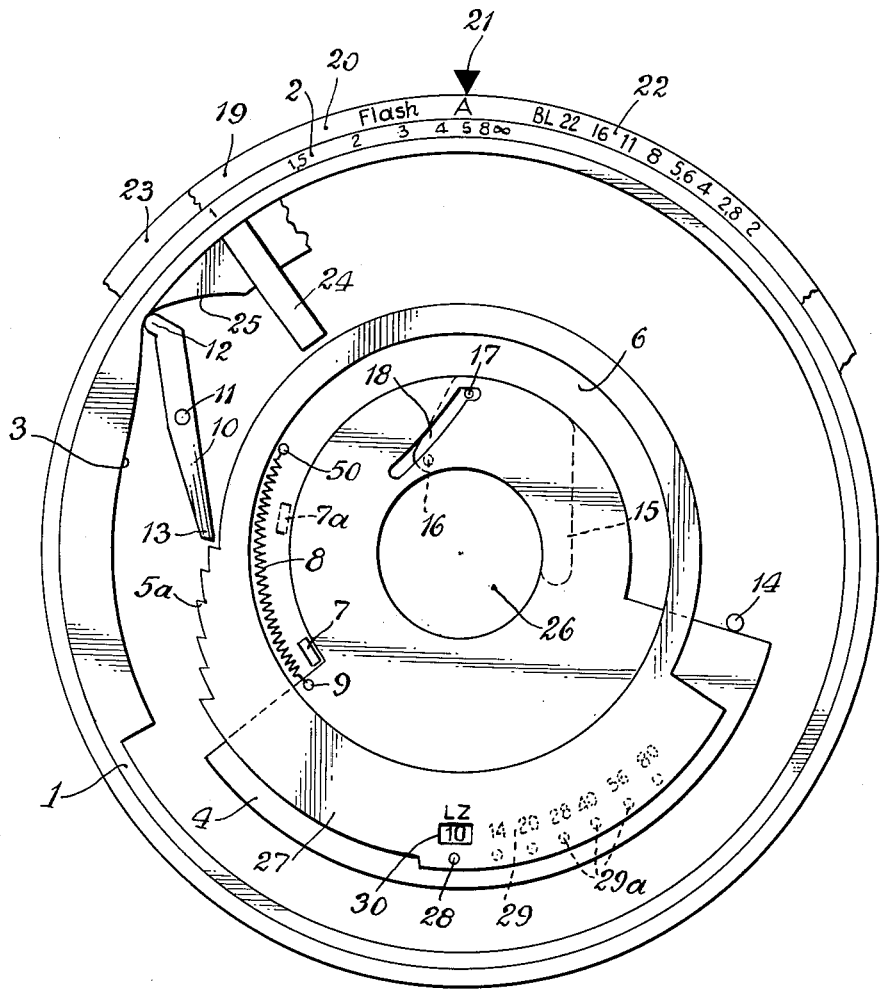
FIG. 2 is a similar view as FIG. 1, but illustrates a modified embodiment of the invention.

The embodiment shown in FIG. 2 distinguishes over that shown in FIG. 1 in that not only one guide number but several guide numbers can be taken into consideration for the flash exposure operation. For this purpose a guide number ring 27, which can be operated and read from the outside, is releasably connected to the diaphragm control ring 4. The guide number ring 27 is provided with an adjustment and reading index having the form of a window 30, and a releasable pin 28 which selectively engages one of various guide number holes 29a along the guide number scale 29. The guide number scale 29 itself and the corresponding coupling holes 29a may be arranged on the diaphragm control ring 4. The ratchet portion 5a is now arranged on the guide number ring 27 which runs off together with the diaphragm control ring 4 when the camera is released. Again, opposite the ratchet portion 5a on the guide number ring 27 is positioned the catch member 10. The cam 3 on the distance adjusting ring 1 will impart to the catch member 10 the same deflections and therewith the same angular positions of different size with respect to the ratchet portion 5 as is the case in the embodiment of FIG. 1.

If instead of the illustrated adjustment to the lowest guide number 10 an adjustment to a higher guide number is desired, then the guide number ring 27 has to be rotated in counterclockwise direction with respect to the diaphragm control ring 4. Thereby the distance between the ratchet portion 5a and the catch member 10 will become greater in the sense of an extension of the path of the return movement. This means that the engagement of the catch member 10 with the ratchet portion 5a will take place the later, the higher the guide number has been selected. Hence, the setting of higher guide numbers will always result in a smaller diaphragm aperture on account of the longer return movement of the ring 4. This effect will be intensified by the particular position of impact caused by the angular position of the catch member 10. The more the catch member 10 has been deflected by the curved parts of the cam which correspond to the smallest distance adjusted, the later the engagement with the ratchet portion 5a will take place.

Figure 3:
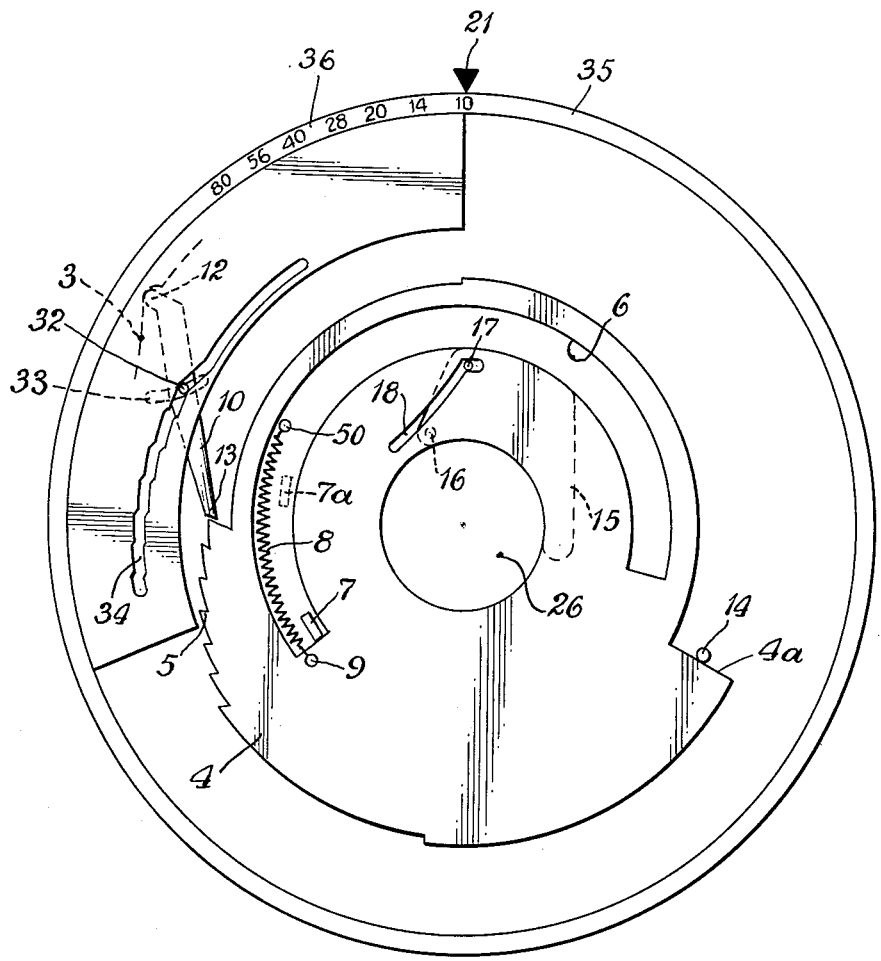
FIG. 3 is a similar view as FIG. 1, but illustrates still another modified embodiment of the invention.

FIG. 3 shows another embodiment of the invention under consideration of the distance as well as of several guide numbers when the flash mechanism is employed. The solution of this problem is characterized in that the catch member 10 is mounted on a pivot pin 32 movable within a slot 33 provided in the casing. The pin 32 in turn is arranged within a stepped cam slot 34 provided in the guide number ring 35. The mode of operation will be easily seen from FIG. 3: When the guide number scale 36 is adjusted to low guide numbers, the pivot pin 32 of the catch member 10 will be in the neighborhood of the ratchet portion 5 at the diaphragm control ring 4 so that, aside from the distance adjustment, an early engagement with the ratchet portion will take place. This means that on account of the short return movement the diaphragm will remain open to a great extent. If, however, higher guide numbers have been selected, then the pivot pin 32 of the catch member 10 will be moved away from the ratchet portion so that an engagement of the catch member 10 with the ratchet portion 5 can take place only at the last and most protruding steps. This means that a considerably longer return movement and thus a stronger closure of the diaphragm has been made possible.

Figure 4:
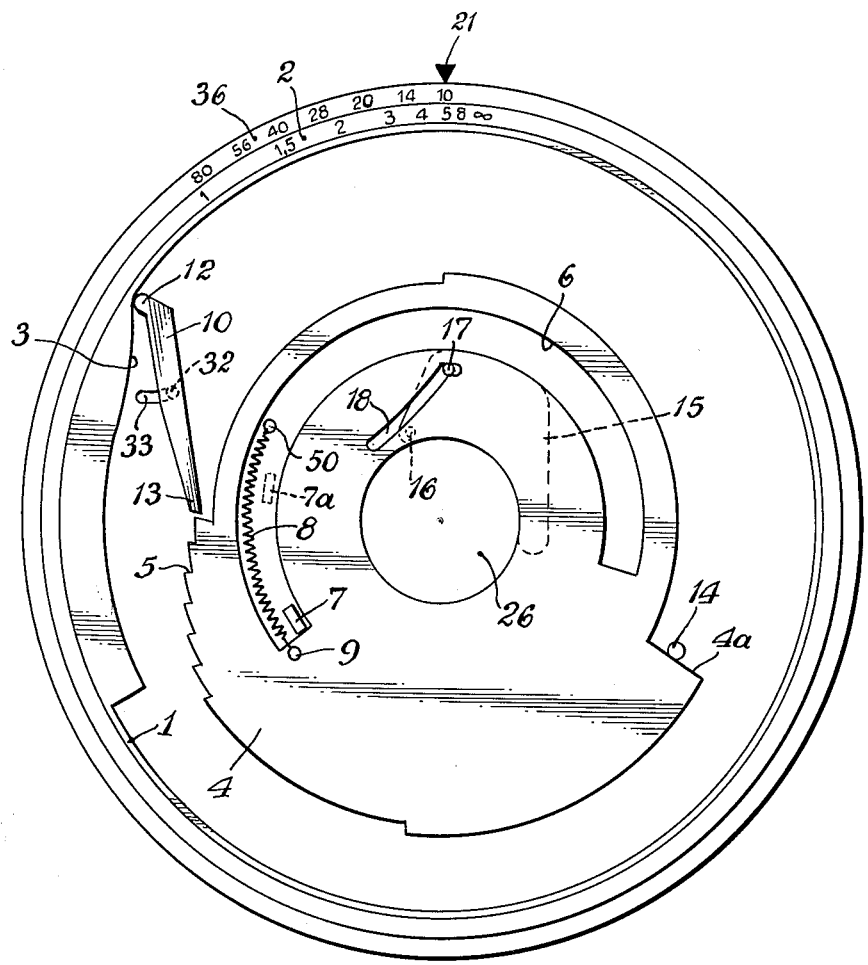
FIG. 4 illustrates the same embodiment as FIG. 3, but shows the parts in a different plane.

In FIG. 3 the cam 3 on the distance adjusting ring 1, which ring may be arranged above or below the guide number ring, is indicated only partially in dashed lines. FIG. 4, however, which is a different sectional view of the structure illustrated in FIG. 3, shows the distance adjusting ring 1 together with its entire cam 3 in full lines.

Figure 5:
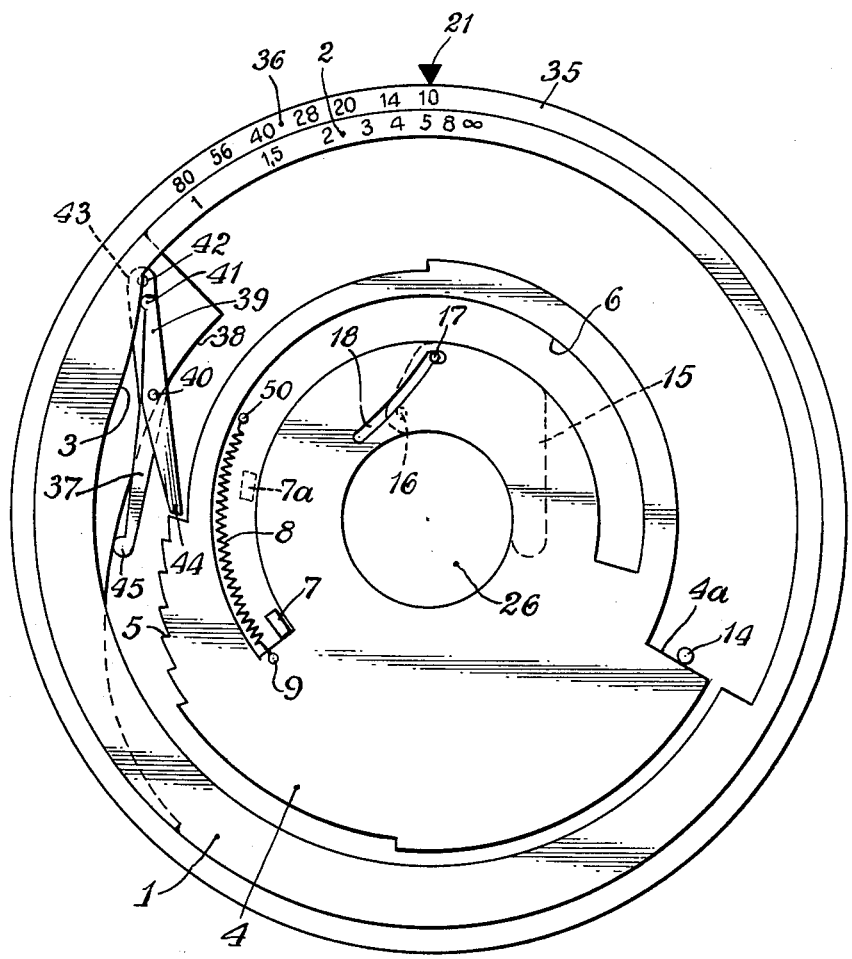
FIG. 5 illustrates still another modified construction of the invention.

FIG. 5 shows an embodiment for solving the same problem that underlies the embodiments shown in the FIGS. 2 to 4. This embodiment is characterized essentially by the provision of a lever combination 37, 39 serving as catch member in place of a single lever. The particular features and arrangements of this lever combination are as follows:

The lever 37 is provided with a stationary pivot pin 42 at its upper end 43. The other end 45 of the lever 37 under the action of a spring engages a cam 38 of the guide number ring 35. The lever 37 carries approximately in its center portion a pivot pin 40 for a second lever 39 which under the action of a spring engages with its upper end 41 the cam 3 of the distance adjusting ring 1, while the lower striking point 44 of the lever 39 is adapted to engage the ratchet portion 5 of the diaphragm control ring 4.

The adjusted distance values as well as the guide number values are introduced into this lever structure 37, 39 in that the lever 37 by the cam 38 on the guide number ring 35 is deflected, whereby the pivot pin 40 for the lever 39 is displaced, and that the lever 39 on its own is deflected by the cam 3 on the distance adjusting ring 1. Consequently, the lever 39 moves under the influence of the changing guide number values toward the ratchet portion and away from it, respectively. Furthermore, in accordance with the adjusted distance values the lever 39 is subjected to changes in its angle of incidence with respect to the ratchet portion 5. The result is the same as in the embodiments described before: When the camera is released, the diaphragm will be the smaller, the smaller the distance values and the higher the guide number values have been adjusted, and vice versa.

Figure 6:
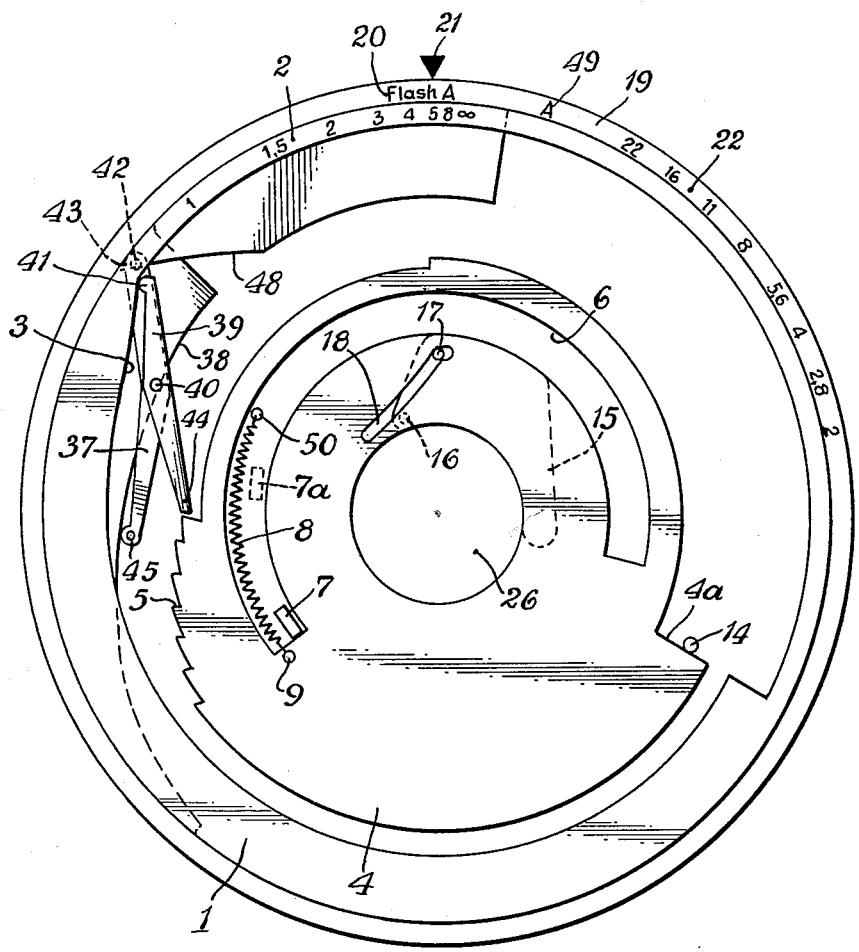
FIG. 6 illustrates another embodiment of the invention.

The suspension of the flash exposure mechanism by rotating the ring 19 for selectively adjusting the camera to the mentioned three ranges of operation in such a manner that the stationary index is opposite the diaphragm numbers 22 has already been described in connection with FIG. 1. In the embodiment of FIG. 1 the catch member consisting of the single lever 10 was rendered ineffective for an engagement with the ratchet portion 5 by the cam 25. FIG. 6 shows the corresponding arrangement for rendering the lever combination 37, 39 ineffective. Also here is provided a cam 48 which, when the camera is switched from the flash exposure mechanism to another range of operation, will engage the upper end 41 of the lever 39 and will rotate the lever 39 in clockwise direction so far that its lower end is no longer in the range of the ratchet portion 5. The lever 37 remains in its position; its further deflections caused by the cam 38 of the guide number ring are immaterial because they are no longer able to bring the removed lever 39 into the range of the ratchet portion 5. In the embodiment of FIG. 6 the guide number ring may be arranged in front or in rear of the actuating ring 19. After the camera has been switched by means of the ring 19 to the flash exposure mechanism, the guide number ring has to be adjusted separately. In the embodiment of FIG. 6 the actuating ring 19 permits the switching to still another range of operation of the camera, namely to an exposure mechanism. This can be done by bringing the mark 49 on the ring 19 into registration with the stationary index 21.

Figure 8:
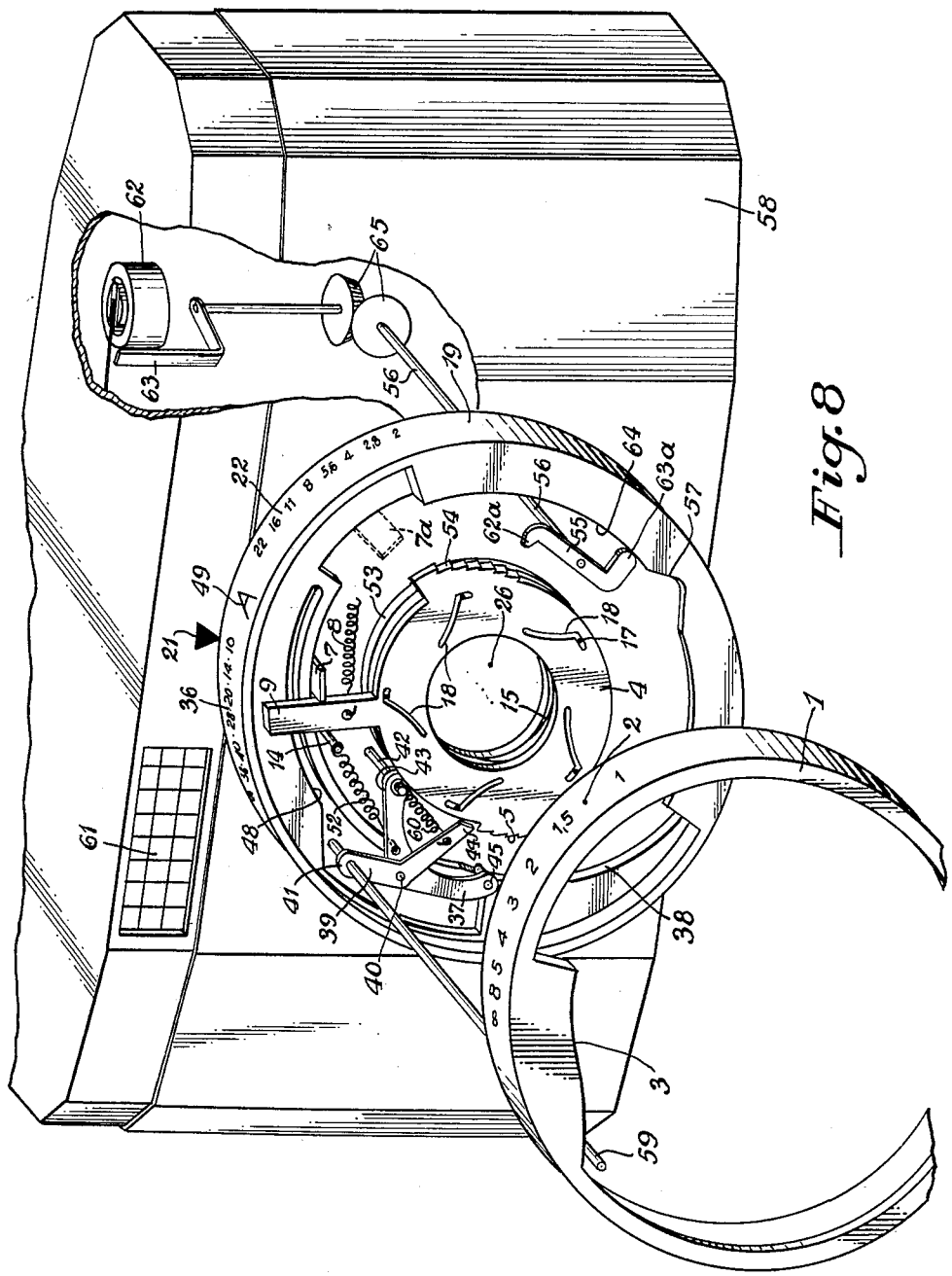
FIG. 8 illustrates in a perspective view a photographic camera equipped with the novel features of the invention.

For operating the camera within the range of the exposure mechanism serves the ratchet portion 54 indicated in FIG. 8 which is also arranged on the diaphragm control ring 4. A catch member 55 controlled by the exposure meter is rendered ineffective by a cam 64 when the camera is switched to another range of operation.

Figure 7:
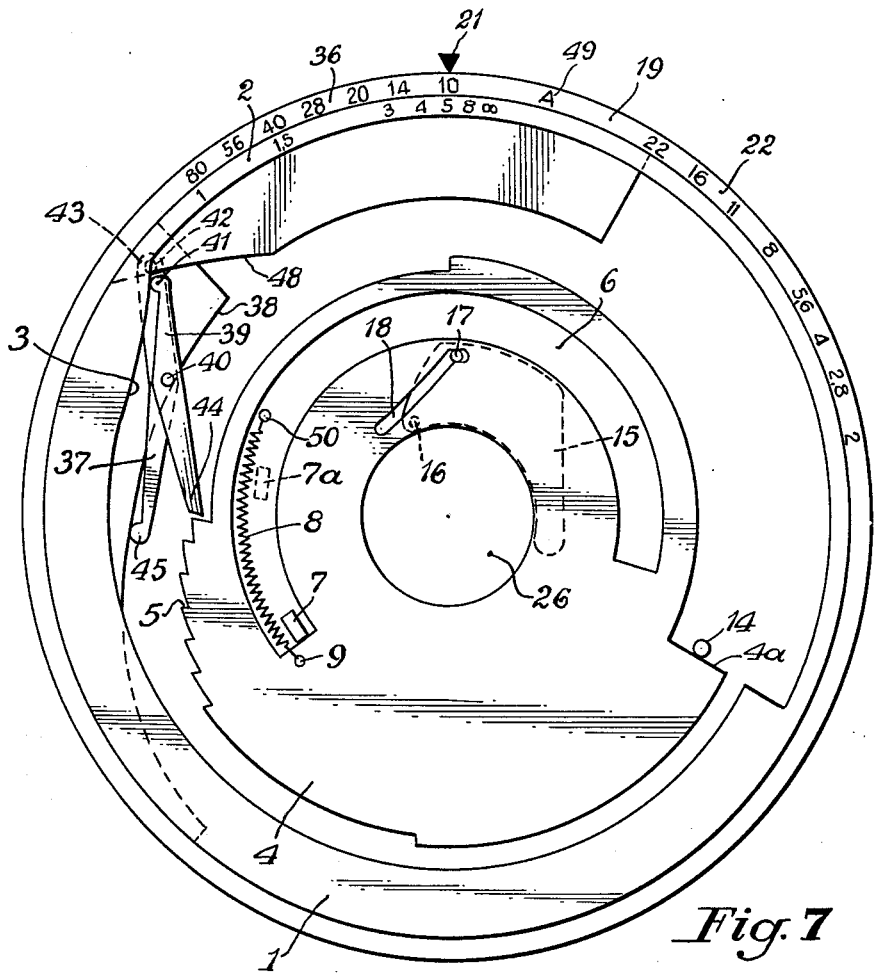
FIG. 7 illustrates a modification of the embodiment of the invention shown in FIG. 6.

The embodiment of FIG. 7 differs from that of FIG. 6 solely by the feature that the actuating ring 19 is provided with a guide number scale 36 on that portion of its circumference which effects the switching to the flash exposure mechanism. This has the advantage that also in the range of the flash exposure operation no separate guide number ring is necessary.

FIG. 8 shows the invention in connection with a camera in a perspective view. Like elements of all figures are designated with like reference characters. FIG. 8 illustrates, however, in addition to the camera casing 58 a photoelectric cell 61 and the following elements: The mentioned additional ratchet portion 54 for the exposure mechanism arranged on the same diaphragm control ring 4 which carries also the ratchet portion 5 for the flash exposure mechanism. The ratchet portion 54 is in cooperation with a catch member 55 which is controlled by the measuring instrument 62 of the exposure meter by means of a scanning member 63 and a gear connection formed by bevel gears 65. The particular means for the deflection of the scanning member 63, as for instance an aspherical disc moved by the instrument as well as a clamping device for the pointer of the instrument, which would be necessary in this connection, have been omitted since they do not form a part of the invention. For the understanding of the exposure mechanism whose inclusion in the structure of the flash exposure mechanism is the issue on hand, it is sufficient to point out that the shaft 56 of the catch member 55 is controlled directly by the measuring instrument of the exposure meter and performs rotative movements by which one end 62a of the catch member 55 is moved toward or away from the ratchet portion 54 so that in dependance from the light value measured a longer or shorter return movement of the diaphragm control ring 4 and the time control ring connected therewith (not shown) is made possible, whereby the diaphragm can be closed more or less and the time can be adjusted accordingly.

The other end 63a of the catch member 55 engages the inner side 64 of the actuating ring 19 for changing to the individual ranges of operation of the camera (manual diaphragm adjustment, exposure adjusting mechanism and flash exposure mechanism). This zone 64 on the inner side of the actuating ring 19 constitutes the disconnecting cam for the catch member 55 and therewith also for the exposure meter. As shown in FIG. 8, the camera has been adjusted to the flash exposure mechanism. By the engagement of the lever end 63a of the catch member 55 with the cam 64 the catch member 55 is removed from the range of the ratchet portion 54. However, as soon as the camera has been adjusted to the range of exposure adjustment by registration of the mark 49, namely "A" with the index 21, the catch member 55 by withdrawal of its end 63a from the recess 57 of the actuating ring 19 is released and under simultaneous disconnection of the flash exposure mechanism the camera is ready for the exposure mechanism. For the purpose of switching off the flash exposure mechanism is provided the cam 48 (see also FIGS. 6 and 7) arranged at the actuating ring 19, which cam is in cooperation with a control rod 59 arranged at the upper end 41 of the catch member 39. The control rod 59, which adjusts the member 39, is also actuated by the cam 3 on the distance adjusting ring 1 in similar manner the cam 3 in FIG. 1 adjusts the member 10.

In the embodiment of FIG. 8 the actuating ring 19 contains the cam 64 for the exposure meter as well as the cam for the flash exposure mechanism. The ring 19 is further provided with the cam 38 for the introduction of the guide numbers into the position of the catch member 39 with respect to the ratchet portion 5 for the flash exposure mechanism. With 53 is designated the second diaphragm cage of the diaphragm mechanism and 52 and 60 are springs which press the levers 37 and 39, respectively, against their cams 38 and 3, respectively.

Figure 9:
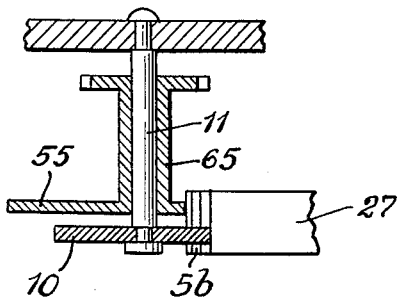
FIG. 9 illustrates a sectional view of a detail of the invention.

FIG. 9 illustrates in a sectional view an arrangement of the catch members with respect to their corresponding ratchet portions, which is different from the arrangement shown in FIG. 8. In place of the two spatially separated ratchet portions 5 and 54 of FIG. 8 the embodiment of FIG. 9 is provided with only one ratchet portion 5b with which the serially arranged catch members for the exposure mechanism and the flash exposure mechanism are in cooperation. As catch member for the flash exposure mechanism is provided the lever 10 with the stationary pivot pin 11 of FIG. 2; the catch member for the exposure meter corresponds to that shown in FIG. 8. The catch member 10 rotates about the pivot pin 11, while for the catch member 55 is provided a tubular shaft 65 surrounding the pivot pin 11.

What I claim is:

1. In a photographic camera provided with a distance adjusting means, an adjustable diaphragm means and means for adjusting the camera to flash exposures including a flash setting means operatively coupled with said adjustable diaphragm means, the improvement comprising a preadjustable spring operated diaphragm which is fully opened when the camera is tensioned independently of the adjusted distance and a flash guide number setting member, said diaphragm including a rotatably mounted diaphragm control ring provided with a ratchet portion, and a pivotally mounted coupling means controlled by said distance adjusting means and said flash guide number setting member and adapted to be engaged by said ratchet portion of said diaphragm control ring when said camera is released so that said diaphragm is closed to a predetermined size.

2. In a photographic camera provided with a distance adjusting ring arranged concentrically about the axis of the camera objective, an adjustable diaphragm adjusting ring arranged concentrically with respect to said distance adjusting ring, and means for adjusting the camera to flash exposures including a flash setting ring operatively connected with said adjustable diaphragm adjusting ring, the improvement comprising a preadjustable spring operated diaphragm which is fully opened when the camera is tensioned independently of the adjusted distance and a flash guide number setting ring, said diaphragm including a rotatably mounted diaphragm control ring provided with a ratchet portion, and a pivotally mounted coupling means controlled by a cam on said distance adjusting ring and adapted to be engaged by said ratchet portion of said diaphragm control ring when said camera is released so that said diaphragm is closed to a predetermined size.

3. In a photographic camera provided with a distance adjusting ring arranged concentrically about the axis of the camera objective, an adjustable diaphragm adjusting ring arranged concentrically with respect to said distance adjusting ring, and means for adjusting the camera to flash exposures including a flash setting ring, the improvement comprising a preadjustable spring operated diaphragm which is fully open when the camera is tensioned independently of the adjusted distance and a flash guide number setting member, and a pivotally mounted coupling means controlled by a cam on said distance adjusting ring and adapted to be engaged by said diaphragm when said camera is released so that said diaphragm is closed to a predetermined size, said diaphragm including a diaphragm segment control ring, and a member operated when the camera is tensioned to rotate said diaphragm segment control ring against the action of a return spring into a position in which the diaphragm is fully open, and means on said control ring forming a ratchet, one of the ratchet steps of which is adapted to engage said coupling means when upon release of the camera said diaphragm segment control ring is rotated by said return spring.

4. In a photographic camera provided with a distance adjusting ring arranged concentrically about the axis of the camera objective, an adjustable diaphragm adjusting ring arranged concentrically with respect to said distance adjusting ring, and means for adjusting the camera to flash exposures including a flash setting ring operatively connected with said adjustable diaphragm adjusting ring, the improvement comprising a preadjustable spring operated diaphragm which is fully opened when the camera is tensioned independently of the adjusted distance and a flash guide number setting member, and a pivotally mounted coupling member controlled by a cam on said distance adjusting ring and adapted to be engaged by said diaphragm when said camera is released so that said diaphragm is closed to a predetermined size, said coupling member comprising a lever pivotally mounted between its ends about a stationary axis and engaging with one end said cam on said distance adjusting ring, the other end of said lever being adapted to be engaged by a member operated by said diaphragm.

5. In a photographic camera provided with a distance adjusting ring arranged concentrically about the axis of the camera objective, an adjustable diaphragm adjusting ring arranged concentrically with respect to said distance adjusting ring, and means for adjusting the camera to flash exposures including a flash setting ring operatively connected with said adjustable diaphragm adjusting ring, the improvement comprising a preadjustable spring operated diaphragm which is fully opened when the camera is tensioned independently of the adjusted distance and a flash guide number setting member, and a pivotally mounted coupling member controlled by a cam on said distance adjusting ring and adapted to be engaged by said diaphragm when said camera is released so that said diaphragm is closed to a predetermined size, said coupling member comprising a lever pivotally mounted between its ends about a stationary axis and engaging with one end said cam on said distance adjusting ring, the other end of said lever being adapted to be engaged by one of a plurality of steps provided on a diaphragm control ring of said diaphragm, said step determining the size of the smallest aperture to which said diaphragm has been preadjusted.

6. A photographic camera according to claim 2, including a flash guide number ring provided for adjusting the camera selectively to a different flash guide number, and means for releasably connecting said flash guide number ring for relative rotative adjustment to said diaphragm adjusting ring.

7. A photographic camera according to claim 2, including a flash guide number ring provided for adjusting the camera selectively to a different flash guide number, and means for releasably connecting said flash guide number ring for relative rotative adjustment to said diaphragm adjusting ring, said flash guide number ring being provided with a window and said diaphragm adjusting ring with a row of guide numbers any one of which may be moved into said window upon relative rotative adjustment of said flash guide number ring and said diaphragm adjusting ring.

8. A photographic camera according to claim 3, in which for the purpose of adjusting the camera to different flash guide numbers said pivotally mounted coupling means is mounted upon a pivot pin which is transversely adjustable in a slot provided in a stationary wall of the camera, and that said pivot pin also extends through a cam slot provided in said flash setting ring.

9. A photographic camera according to claim 3, in which said coupling means consists of a pair of operatively connected pivoted levers of which one lever of said pair engages with one of its two ends said cam on said distance adjusting ring, while its other end is adapted to be engaged by one of a plurality of ratchet steps on said diaphragm control ring, while the other of said pair of levers is changed in its position depending upon the selected flash guide number and thereby controls the position of said first lever.

10. A photographic camera according to claim 3, in which said coupling means consists of a pair of operatively connected pivoted levers of which one lever of said pair engages with one of its two ends said cam on said distance adjusting ring, while its other end is adapted to be engaged by one of a plurality of ratchet steps on said diaphragm control ring, while the other of said pair of levers is engaged by a cam provided on an adjustable flash guide number ring and thereby controls the position of said first one of said pair of levers.

11. A photographic camera according to claim 3, in which said coupling member consists of a pair of operatively connected pivoted levers of which one lever of said pair engages with one of its two ends said cam on said distance adjusting ring, while its other end is adapted to be engaged by one of a plurality of ratchet steps on said diaphragm control ring, while the other of said pair of levers is engaged by a cam provided on an adjustable flash guide number ring and thereby controls the position of said first one of said pair of levers, said distance adjusting ring and said flash guide number setting member are arranged one next to the other and cooperate with a common reading index.

12. A photographic camera according to claim 2, including a manually rotatable operating ring for changing the camera from flash operation to a manual diaphragm setting and vice versa, said operating ring being adjustable in both its operating ranges to a common index and being provided with a cam for selectively rendering flash exposures possible and impossible.

13. In a camera according to claim 3, including exposure meter means, and means for automatically adjusting the exposure time and the diaphragm aperture associated therewith in accordance with the indication of said exposure meter, a pivotally mounted lever controlled by said exposure meter, another ratchet provided on said control ring the steps of which will operate with one end of said lever.

14. In a camera according to claim 3, including exposure meter means, and means for automatically adjusting the exposure time and the diaphragm aperture associated therewith in accordance with the indication of said exposure meter, a pivotally mounted lever controlled by said exposure meter, another ratchet provided on said control ring the steps of which cooperate with one end of said lever, said two ratchets being arranged one opposite the other on said control ring.

15. In a camera according to claim 3, including exposure meter means, and means for automatically adjusting the exposure time and the diaphragm aperture associated therewith in accordance with the indication of said exposure meter, said ratchet on said control ring being adapted to be engaged by said coupling means and another coupling means engageable with said ratchet which is controlled by said exposure meter.

16. In a photographic camera provided with a distance adjusting ring arranged concentrically about the axis of the camera objective, an adjustable diaphragm adjusting ring arranged concentrically with respect to said distance adjusting means, and means for adjusting the camera to flash exposures including a flash setting ring, the improvement comprising a pre-adjustable spring operated diaphragm which is fully opened when the camera is tensioned independently of the adjusted distance and flash guide number setting member, and a pivotally mounted coupling means controlled by a cam on said distance adjusting ring and adapted to be engaged by said diaphragm when said camera is released so that said diaphragm is closed to a predetermined size, said diaphragm including a diaphragm segment control ring, and a member operated when the camera is tensioned to rotate said diaphragm segment control ring against the action of a return spring into a position in which the diaphragm is fully open, means on said control ring forming a ratchet, one of the ratchet steps of which is adapted to engage said coupling means when upon release of the camera said diaphragm segment control ring is rotated by said return spring, exposure meter means, and means for automatically adjusting the exposure time and the diaphragm aperture associated therewith in accordance with the indication of said exposure meter, said ratchet on said control ring being adapted to be engaged by said coupling means operated by said exposure meter and by a pair of coupling means controlled by said flash setting number ring.

17. In a camera according to claim 16, including a manually operable operating ring for selectively changing the camera for making flash exposures, for manual diaphragm adjustment and for automatic exposure meter adjustment, said operating ring being provided with cams for selectively rendering inoperative two coupling members which are to be ineffective when the remaining third coupling member is to be effective.

References Cited in the file of this patent
UNITED STATES PATENTS

| | | |
|---|---|---|
| 2,803,182 | Werner | Aug. 20, 1957 |
| 2,965,011 | Rentschler | Dec. 20, 1960 |
| 2,974,576 | Hahn | Mar. 14, 1961 |